United States Patent [19]

Nasu et al.

[11] Patent Number: 4,882,639
[45] Date of Patent: Nov. 21, 1989

[54] CHANGEOVER WRITING CIRCUIT FOR MAGNETIC DISK APPARATUS OPERABLE AT PLURAL DENSITIES

[75] Inventors: Masahiro Nasu; Kiyoto Abe, both of Furukawa, Japan

[73] Assignee: Alps Electric Co., Ltd., Tokyo, Japan

[21] Appl. No.: 274,685

[22] Filed: Nov. 22, 1988

Related U.S. Application Data

[63] Continuation of Ser. No. 879,475, Jun. 27, 1986, abandoned.

[30] Foreign Application Priority Data

Jul. 3, 1985 [JP] Japan .................... 60-147478

[51] Int. Cl.$^4$ .................................. G11B 5/09
[52] U.S. Cl. .................................. 360/65; 360/46; 360/67; 360/66
[58] Field of Search .................. 360/46, 65, 66, 67, 360/62

[56] References Cited

U.S. PATENT DOCUMENTS

| | | | |
|---|---|---|---|
| 3,465,321 | 2/1966 | Reisfeld | 360/67 |
| 3,930,265 | 12/1975 | Kimura | 360/46 |
| 3,996,614 | 12/1976 | Budejicky | 360/45 |
| 4,274,116 | 6/1981 | Ida | 360/65 |
| 4,288,827 | 9/1981 | Sato | 360/66 |
| 4,371,901 | 2/1983 | Shah | 360/65 |
| 4,644,419 | 2/1987 | Iinuma et al. | 360/46 |
| 4,656,533 | 4/1987 | Sakai et al. | 360/46 |
| 4,805,047 | 2/1989 | Nasu et al. | 360/46 |

OTHER PUBLICATIONS

Nilsson, James W., *Electric Circuits*, Addison-Wesley, 1983 pp. 42-44.

Primary Examiner—Alan Faber
Assistant Examiner—Surinder Sachar
Attorney, Agent, or Firm—Guy W. Shoup; Paul J. Winters; Norman R. Klivans

[57] ABSTRACT

A magnetic recording and reproducing apparatus which can write magnetic information in different recording periods so that information stored in a magnetic medium can be modified or corrected therewith in whichever recording period it is recorded. The apparatus comprises a bias change-over circuit for changing over the voltage to be applied to a magnetic head to effect recording in a recording period which is different from recording and reproducing characteristics of the magnetic head, and a writing circuit for supplying a writing current to the magnetic head in response to a voltage from the bias change-over circuit. Thus, by changing over the writing current, a recording period for recording on the magnetic medium can be modified.

2 Claims, 3 Drawing Sheets the circuit of FIG. 3 when information recorded in a recording format for 1 megabyte on a magnetic disk for 1 megabyte using a floppy disk drive unit for 2 megabytes is read out on another disk drive unit for 1 megabyte.

CHANGEOVER WRITING CIRCUIT FOR MAGNETIC DISK APPARATUS OPERABLE AT PLURAL DENSITIES

This application is a continuation of application serial no. 06/879,475, filed 06/27/86, now abandoned.

BACKGROUND OF THE INVENTION

This invention relates to a magnetic recording and reproducing apparatus which can read and write information in different recording periods from and on floppy disks of a magnetic media for which recording periods are different such as for 1 megabyte and 2 megabytes, and more particularly to an apparatus of the type which is improved in compatibility in writing performance with a magnetic recording and reproducing apparatus for a small storage capacity.

A floppy disk drive unit as a general magnetic recording and reproducing apparatus has come in wide use as a means for recording and reproducing information for use with a personal computer, a word processor, and so on. As general information is diversified and increased in density, it is required to be reduced in size and have an increased capacity for recording information.

Such a requirement is partially met as the technical development of magnetic recording and reproducing apparatus has progressed of late: for example, a magnetic disk of a size of 3.5 inches can store information of 2 megabytes.

However, the recording period of a floppy disk drive unit for recording and reproducing information of such a large capacity as 2 megabytes is about one half to that of a floppy disk drive unit for such a small capacity as 1 megabyte, and magnetic heads for such recording periods are different in recording and reproducing characteristics. Accordingly, information recorded in a longer recording period on a magnetic disk cannot be reproduced nor re-recorded on a floppy disk drive unit for a shorter recording period, and hence it must be rewritten once in a format of the shorter recording period, resulting in inconvenience.

Accordingly, a floppy disk drive unit is required to allow reading and writing with a single system of a magnetic disk which is recorded in a different recording period.

Now, a conventional floppy disk drive unit will be described with reference to FIG. 3 which illustrates a construction of a circuit for reading and writing information for 2 megabytes.

Referring to FIG. 3, the circuit includes a magnetic head 1, a change-over circuit 2, a preamplifier 3, a reading circuit 5, a writing circuit 8 and a filter circuit 9.

The magnetic head 1 writes and reads magnetic record data on and from a magnetic disk. The change-over circuit 2 operates in response to a changing over instruction from a host computer not shown to change over to couple signals read by the magnetic head 1 to the preamplifier 3 or alternatively to couple signals from the writing circuit 8 to the magnetic head 1.

Signals inputted from the magnetic head 1 to the preamplifier 3 via the change-over circuit 2 are amplified to a desired voltage and outputted to the filter circuit 9.

The filter circuit 9 receives signals from the preamplifier 3 over two signal lines. To one signal line, a capacitor C1, a resistor R1 and an inductor L1 are connected in series while a capacitor C2, a resistor R2 and an inductor L2 are connected in series to the other signal line.

A capacitor 7 is connected in parallel with the two signal lines between junctions between the resistor R1 and the inductor L1 and between the resistor R2 and the inductor L2. A capacitor C6 and a resistor R9 are connected in parallel relationship between one terminal end of each of the inductors L1 and L2, that is, at junctions between the filter circuit 9 and the reading circuit 5.

Thus, DC voltage components and very low frequency components of signals from the preamplifier 3 are cut by the capacitors C1 and C2 while high frequency components are cut by the inductors L1 and L2 and the capacitors C6 and C7 which interconnect corresponding ends of the inductors L1 and L2. General voltage division is attained by the resistors R1 and R2 and the resistor R9 to produce a predetermined output level.

The filter circuit 9 having such a construction as described above filters only a frequency band necessary for reading of data and outputs it to the reading circuit 5.

The reading circuit 5 differentiates signals from the filter circuit 9 and shapes waveforms of the signals into pulse signals including digital codes of 0 and 1. The pulse signals are outputted to the host computer (not shown).

The writing circuit 8 converts input data from the host computer into a level of voltage in accordance with recording and reproducing characteristics of a magnetic disk for 2 megabytes and of the magnetic head 1. The input data thus converted is delivered to the magnetic head 1 via the change-over circuit 2. In this instance, the change-over circuit 2 has been changed over, in response to an instruction from the host computer, to connect the magnetic head 1 to the writing circuit 8.

However, a magnetic recording and reproducing apparatus for 2 megabytes as described above presents problems as hereinafter described when one tries to record in a format different in recording period such as for 1 megabyte, causing an error in operation although a magnetic disk of the same shape is used and is rotated at the same speed. Such problems will be described with reference to FIGS. 3 and 4.

FIG. 4 illustrates operations of different portions of the circuit of FIG. 3 when information recorded in a recording format for 1 megabyte on a magnetic disk for 1 megabyte using a floppy disk drive unit for 2 megabytes is read out on another disk drive unit for 1 megabyte.

Upon writing, input data of a recording period for 1 megabyte corresponding to digital codes including 1 and 0 as seen in (a) of FIG. 4 are delivered from the host computer to the writing circuit 8 of a floppy disk drive unit for 2 megabytes. In response to the input data, the writing circuit 8 supplies to the magnetic head 1 a writing current of a value I1 for 2 megabytes in a recording period for 1 megabyte as seen in (b) of FIG. 4. A magnetic disk for 1 megabyte recorded with the magnetic head 1 has written thereon a magnetic pattern in which the magnetization polarity is reversed in alternate relationship as indicated by N and S in (c) of FIG. 4 with variations in magnetization intensity as shown by a solid line in (d) of FIG. 4.

If the magnetic disk recorded in this way are reproduced on another floppy disk drive unit for 1 megabyte, a voltage of a waveform as shown in (e) of FIG. 4 is outputted from its magnetic head. A portion of the waveform called a shoulder as indicated by S1 to S5 is caused due to an excessively high resolution of writing characteristics of the magnetic head for 2 megabytes relative to the writing characteristics of the magnetic head for 1 megabyte. The difference in resolution arises mainly from magnetic gaps. The voltage waveform (e) from the magnetic head is delivered to the reading circuit via the filter circuit for 1 megabyte and is differentiated thereby into a waveform as shown in (f) of FIG. 4. The waveform (f) thus differentiated is then converted into a square wave signal as shown in (g) of FIG. 4 of a zero volt comparator or the like and then into pulse signals as shown in (h) of FIG. 4 in accordance with variations of the square wave signal. The pulse signals are then coupled to the host computer. The pulse signals (h) involve error pulses E1 to E5 caused by appearances of the shoulders S1 to S5 as described above. If the error pulses E1 to E5 are inputted to the host computer, this will result in inputting of unnecessary additional pulses for a period for 1 megabyte to the host computer. As a result, an output of the host computer will involve error portions as shown by E in (i) of FIG. 4, and the error portions will be outputted as 1 despite that the magnetization polarity as shown in (c) of FIG. 4 is not reversed as in the error pulses E2 and E4, causing an error in operation.

In addition to the problems described above, particularly where a magnetic disk recorded with a floppy disk drive unit for 1 megabyte is additionally recorded with another magnetic head for 2 megabytes, it is actually impossible to effect a filtering operation to discriminate, upon reproduction, additionally recorded signals from the formerly recorded signals. Accordingly, additional recording must be done after additional information has been rewritten in an appropriate recording period, and this requires much time.

SUMMARY OF THE INVENTION

Accordingly, it is an object of the present invention to provide a magnetic recording and reproducing apparatus which can write magnetic information in a long recording period such as for 1 megabyte with good compatibility using a magnetic head adapted for a short recording period such as for 2 megabytes.

In order to resolve the technical subject as described above, according to the present invention, a magnetic recording and reproducing apparatus comprises a magnetic head for recording and reproducing information on and from a magnetic medium, a bias change-over circuit for changing over the voltage to be applied to the magnetic head to effect recording in a recording period which is different from recording and reproducing characteristics of the magnetic head, and a writing circuit for supplying a writing current to the magnetic head in response to a voltage from the bias change-over circuit, whereby a recording period for recording on the magnetic medium is modified by changing over the writing current.

DETAILED DESCRIPTION OF THE PREFERRED EMBODIMENT

Now, the present invention will be described in detail with reference to FIGS. 1 and 2 of the accompanying drawings. In these figures, like parts or elements to those described above in connection with the conventional apparatus are designated by like reference symbols, and detailed description of them are omitted herein.

Figure 1:
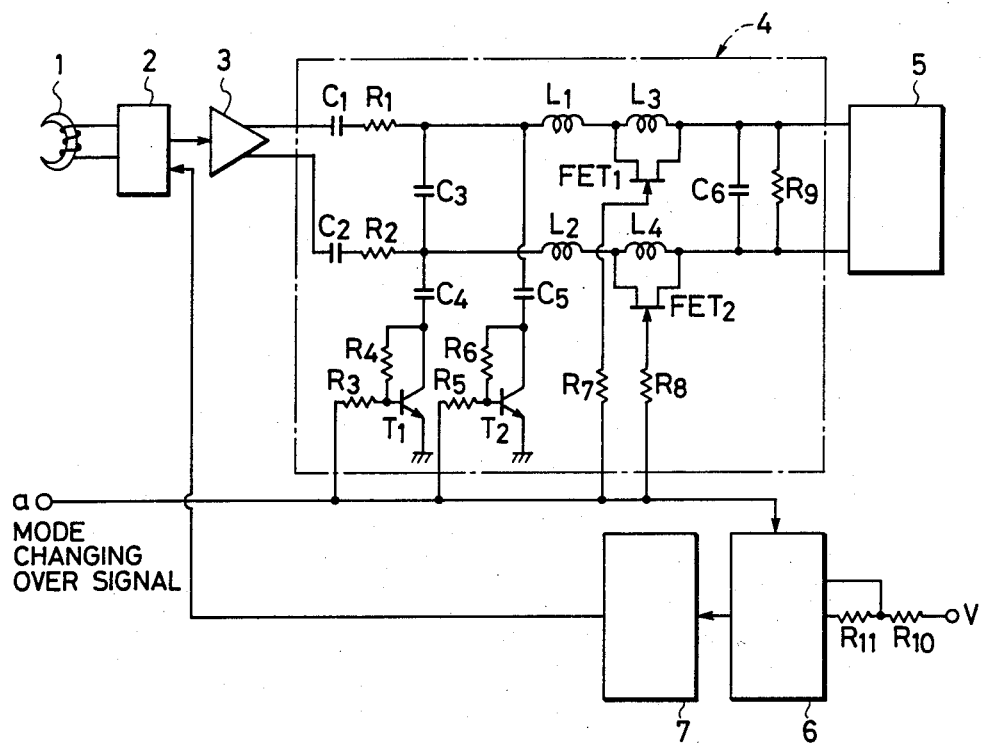
FIG. 1 is a circuit diagram illustrating an electric construction of a magnetic recording and reproducing apparatus according to a preferred embodiment of the present invention.
Figure 3:
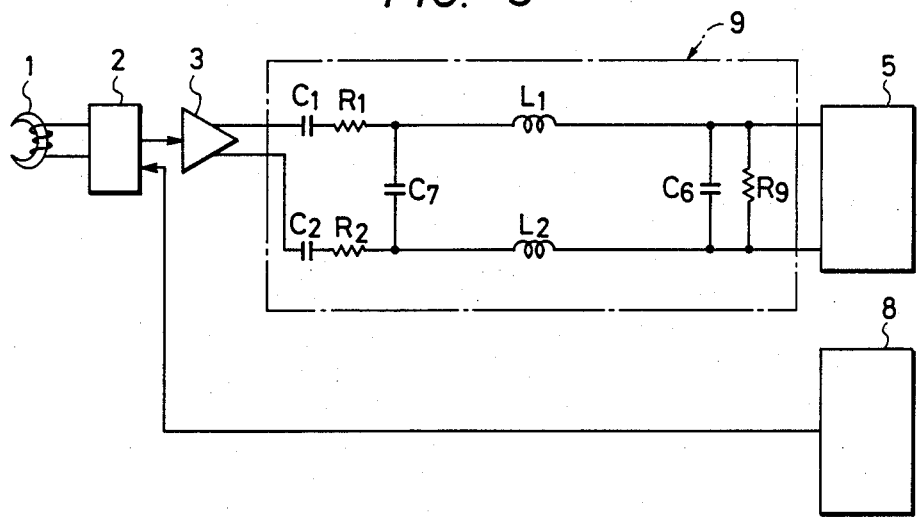
FIG. 3 is a circuit diagram illustrating an electric construction of a conventional magnetic recording and reproducing apparatus.

Referring to FIG. 1, the circuit includes a filter circuit 4, a bias change-over circuit 6, and a writing circuit 7.

At first, construction of the circuit will be described. A magnetic head 1 for recording and reproduction for 2 megabytes is connected to a change-over circuit 2 which is operable to change over to couple a signal detected by the magnetic head 1 to a preamplifier 3 or alternatively to couple a recording signal from the writing circuit 7 to the magnetic head 1. Signals from the preamplifier 3 are coupled to the filter circuit 4. The filter circuit 4 includes inductors L3 and L4 connected in series to inductors L1 and L2, respectively, which are in turn connected in series to two signal lines from the preamplifier 3. The sources and drains of field effect transistors FET1 and FET2 are connected in parallel to the inductors L3 and L4, respectively. A mode changing over signal a is applied to the gates of the FET1 and FET2 via resistors R7 and R8, respectively, for a changing over operation as hereinafter described. The filter circuit 4 further includes a pair of capacitors C4 and C5 connected to opposite ends of another capacitor C3 which is connected in parallel relationship to the input signals thereto. The capacitors C4 and C5 are connected at the opposite ends thereof to the collectors of a pair of transistors T1 and T2. A pair of resistors R3 and R5 for base biasing are connected between the collectors and the bases of the transistors T1 and T2, respectively, and a mode changing over signal a is applied to the bases of the transistors T1 and T2 via the resistors R3 and R5, respectively. The emitters of the transistors T1 and T2 are grounded. Thus, if a conducting condition is established between the collectors and the emitters of the transistors T1 and T2 in response to a mode changing over signal a, the capacitors C4 and C5 will become in parallel with the capacitor C3, resulting in increase in electrostatic capacity.

Meanwhile, the mode changing over signal a is also coupled to the bias change-over circuit 6. The bias change-over 6 is connected to a power source terminal V via a resistor R10 and via the resistor R10 and another resistor R11 so that different voltages may be applied thereto. The bias change-over circuit 6 thus outputs either one of the voltages from the power source terminal V to the writing circuit 7 in response to a mode changing over signal a.

The writing circuit 7 receives input data for recording for 1 megabyte and 2 megabytes from a host computer and outputs writing signals of a level of voltage in accordance with a voltage from the bias change-over circuit 6 to the change-over circuit 2. The change-over circuit 2 thus receives a changing over instruction from the host computer to effect a changing over operation to output the writing signals to the magnetic head 1.

Operation of the apparatus will now be described. When input data are to be delivered to the writing circuit 7 from a host computer, a changing over instruction from the host computer is delivered to the change-over circuit 2 so that it may be changed over to energize the magnetic head 1 with a writing current from the writing circuit 7. When the input data supplied to the writing circuit 7 has a recording period for 1 megabyte and thus correspond to the digital codes as shown in (a) of FIG. 2, the mode changing over signal a delivered from the host computer to the bias change-over circuit 6 presents a low level. In this instance, the bias change-over circuit 6 applies to the writing circuit 7 a voltage which is supplied from the power source terminal V only by way of the resistor R10. The voltage in this instance is selected to have a level which is determined in accordance with a low coercive force characteristic of a magnetic disk for 1 megabyte and also with an excitation intensity with which the magnetic head 1 for 2 megabytes can write in a recording period for 1 megabyte. Thus, the magnetic head 1 is energized as illustrated in (b') of FIG. 2 in response to the input data delivered from the writing circuit 7. The electric current in this instance presents a level as indicated by I2 in (b') of FIG. 2, and this current level I2 is about twice to the level of the electric current when the same magnetic head 1 writes in a recording period for 2 bytes. It is to be mentioned that air gaps of magnetic heads for 2 megabytes and 1 megabyte are different in length and 0.8 $\mu$m and 2 $\mu$m, respectively, while the ratio in length between the recording periods for 2 megabytes and for 2 megabyte is about 1:2, and the coercive force characteristic of a magnetic disk for 2 megabytes is greater in value than that for 1 megabyte. The magnetic head 1 provides magnetization polarities as shown in (c) of FIG. 2 and thus records on a magnetic disk a magnetic pattern which presents variations with moderate reversing characteristics corresponding to the recording period for 1 megabyte as seen in (d') of FIG. 2. On the contrary, when the input data supplied to the writing circuit 7 has a recording period for 2 megabytes, the mode changing over signal a supplied from the host computer to the bias change-over circuit 6 presents a high level. In this instance, the bias change-over circuit 6 is changed over to apply to the writing circuit 7 a voltage supplied thereby by way of the resistors R10 and R11. The level of the electric current then is about one half to the current level when recording in the recording period for 1 megabyte as described above.

On the other hand, if the changing over instruction supplied from the host computer to the change-over circuit 2 instructs to deliver a signal read by the magnetic head 1 to the preamplifier 3, the reading circuit 5 operates in a recording period in accordance with a mode changing over signal a in response to an instruction from the host computer not shown.

Here, when a detection signal for 1 megabyte is outputted from the magnetic head 1, the mode changing over signal is at its low level.

In response to the mode changing over signal a of the low level, the field effect transistors FET1 and FET2 and the transistors T1 and T2 are open-circuited between the sources and drains and between the collectors and emitters, respectively.

As a result, values of inductances connected in series to the two signal lines from the preamplifier 3 become inductances of the inductors L2 and L4 added by those of the inductors L1 and L3, respectively, while the capacitance between the inductors L1 and L2 becomes that of the capacitor 3. The waveform of a signal as indicated by a broken line e'1 in (e') of FIG. 2 from the preamplifier 3 is filtered to remove high frequency components therefrom by the sums of the inductances of the inductors between L1 and L3 and between L2 and L4 and also by the capacitance of the capacitors C3 and C6 connected to opposite ends of the inductors L1 and L3 and of the inductors L2 and L4 so that only those frequency components from which signals for 1 megabyte as indicated by a solid line e'2 in (e') of FIG. 2 can be reproduced are outputted as signals of an output waveform to the reading circuit 5.

The sums of the inductances of the inductors L1 and L3 and L2 and L4 and the capacitances of the capacitors C3 and C6 as impedance elements are selected to cut unnecessary high frequency components in accordance with the frequency characteristics when a magnetic disk recorded in a recording period for 1 megabyte is reproduced with a magnetic head 1 for 2 megabytes.

Figure 2:
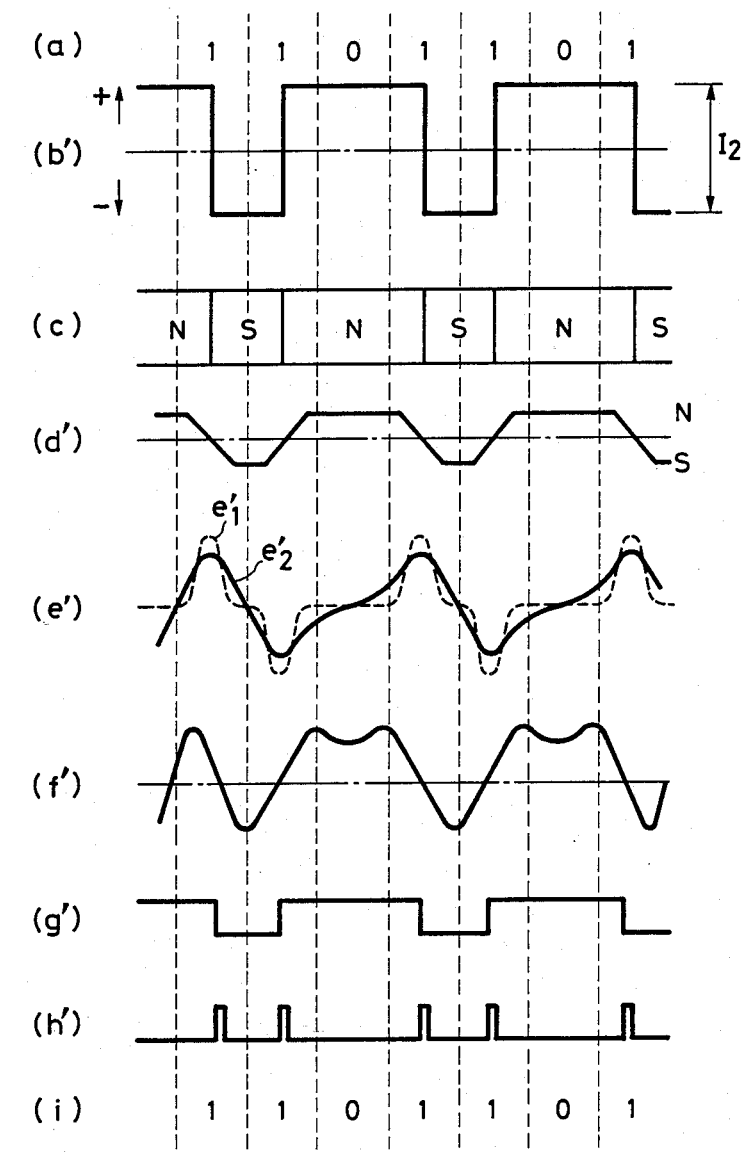
FIG. 2, consisting of (a)(b')(c)(d')(e')(f')(g')(h')(i), is a diagram illustrating operations of the apparatus of FIG. 1.
Figure 4:
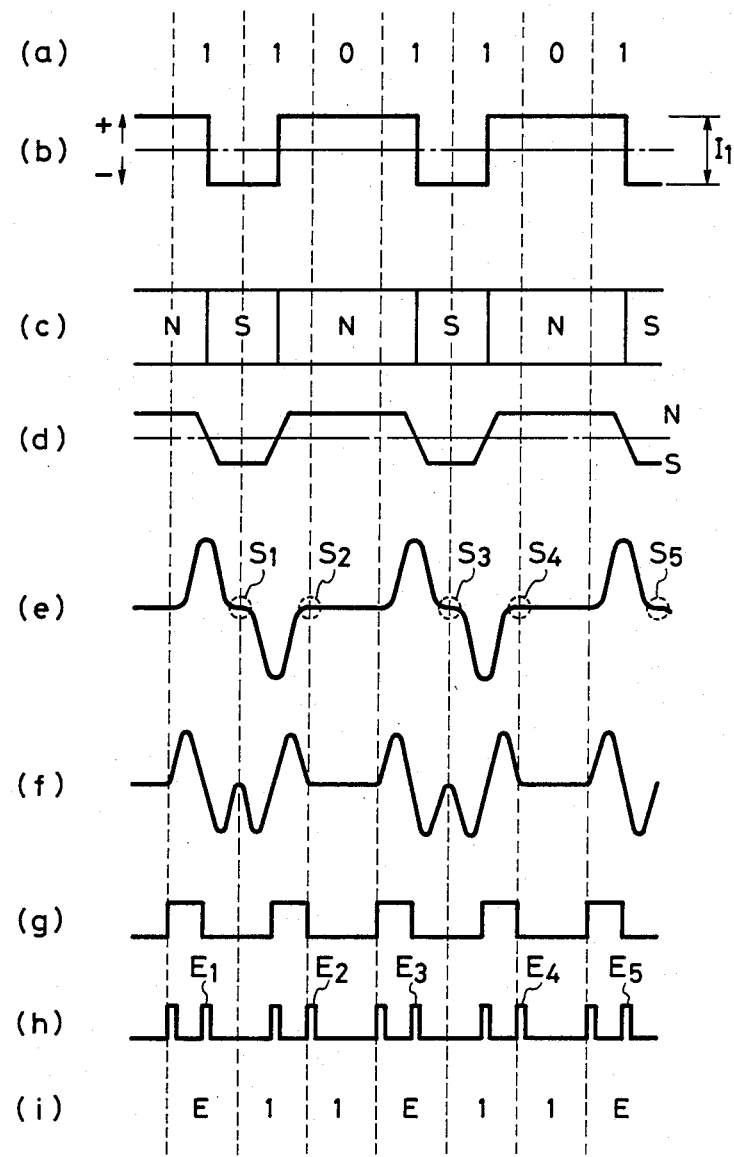
FIG. 4, consisting of (a)-(i), is a diagram illustrating operations of the apparatus of FIG. 3.

The waveform (e'2) of the signal outputted from the filter circuit 4 then is differentiated by a differentiator of the reading circuit 5 into a waveform as shown in (f') of FIG. 2 and is then converted into a square wave signal as shown in (g') of FIG. 2 by a zero volt comparator or the like. The square wave signal (g') is pulse shaped in accordance with variations thereof to produce a pulse waveform as shown in (h') of FIG. 2 which is outputted to the host computer. This pulse waveform (h') is judged properly as a signal for 1 megabyte by the host computer.

Meanwhile, when a signal for 2 megabyte is to be outputted from the magnetic head 1, the mode changing over signal a is set to the high level. Thus, in response to the mode changing over signal a of the high level, the field effect transistors FET1 and FET2 and the transistors T1 and T2 are brought into conducting conditions between the sources and drains and between the collectors and emitters, respectively.

Accordingly, the inductances in series to the two signal lines from the preamplifier 3 become equal to the inductances of the inductors L1 and L2 due to short-circuiting of the inductors L3 and L4, respectively, while the capacitance between the inductors L1 and L2 becomes equal to the capacitance of the capacitor C3 added to a combined capacity of the capacitors C4 and C5.

The influence of the mode changing over signal a applied then on the signal lines is minimized and arises from a quantity of electricity momentarily stored in the gates of the field effect transistors FET1 and FET2 and also from a difference in base current between the transistors T1 and T2 due to fluctuations of such base currents. By the difference in base current between the transistors T1 and T2, the center of the output waveform is displaced only a little.

Of the signals for 2 megabytes from the preamplifier 3, only frequency components with which signals for 2 megabytes can be reproduced are outputted to the reading circuit 5 due to the inductances of the inductors L1 and L2, a combined capacitance of the capacitors C3, C4 and C5 connected to opposite ends of the inductors L1 and L2, and the capacitance of the capacitor C6.

The signals for 2 megabytes inputted from the filter circuit 4 are processed in a similar manner to that of the reading operation for 1 megabyte by the reading circuit 5 and is thus judged properly as pulse signals for 2 megabytes by the host computer.

As apparent from the foregoing description, according to the present invention, a magnetic head for 2 megabytes is energized with a high electric current for 1 megabyte to effect recording for 1 megabyte so that the characteristics of polarity reversals in a magnetic pattern thus recorded can be made compatible with those in a magnetic pattern recorded with a different magnetic head for 1 megabyte. Accordingly, the present invention provides an effect that, while it has been conventionally impossible to additionally record with a magnetic head for 2 megabyte on a magnetic disk pre-recorded for 1 megabyte, according to the invention, information stored in a magnetic disk for 1 megabyte can be modified or corrected with a floppy disk drive unit for 2 megabytes.

What is claimed is:

1. A changeover read-write circuit for a magnetic recording and reproducing apparatus including a magnetic head for reading and writing data on a magnetic medium, comprising:

a bias changeover circuit connected to a voltage source providing two different voltages to the bias changeover circuit, whereby the bias changeover circuit outputs two different voltages in response to a two level mode changing over signal provided by a host computer to the bias changeover circuit, the bias changeover circuit outputting a first voltage upon receiving a first level mode changing over signal, and outputting a second voltage upon receiving a second level mode changing over signal;

a write circuit connected to the bias changeover circuit so as to receive the two voltages output by the bias changeover circuit, and also connected to receive input data from the host computer to output in response thereto writing signals at two different current levels, the first current level writing signals being output proportionally to the first voltage output by the bias changeover circuit and the second current level writing signals being output proportionally to the second voltage output by the bias changeover circuit; and a changeover circuit connected to receive the outputs of the write circuit and to provide same to the magnetic head for writing on the magnetic medium, and connected to receive read signals from the magnetic head for reading from the magnetic medium, the changeover circuit changing over from reading to writing and vice versa in response to signals from the host computer.

2. The circuit of claim 1, further comprising a filter circuit connected to the changeover circuit to selectively filter the read signals from the changeover circuit;

wherein the filter circuit selects between at least two modes in response to the two level mode changing over signal which is provided directly by the host computer to the filter circuit, and is not modified by the bias changeover circuit.

* * * * *